US012578799B2

(12) United States Patent
Batteas et al.

(10) Patent No.: US 12,578,799 B2
(45) Date of Patent: Mar. 17, 2026

(54) TECHNOLOGIES FOR OPTICALLY CONTROLLING FRICTION WITH PLASMON-ACTIVE PHOTOFRICTION ELEMENTS

(71) Applicant: THE TEXAS A&M UNIVERSITY SYSTEM, College Station, TX (US)

(72) Inventors: James Batteas, College Station, TX (US); Maelani N. N. Guarino, College Station, TX (US); Matthew Sheldon, College Station, TX (US); Mary Cynthia Hipwell, College Station, TX (US)

(73) Assignee: THE TEXAS A&M UNIVERSITY SYSTEM, College Station, TX (US)

(*) Notice: Subject to any disclaimer, the term of this patent is extended or adjusted under 35 U.S.C. 154(b) by 0 days.

(21) Appl. No.: 18/843,457

(22) PCT Filed: Mar. 2, 2023

(86) PCT No.: PCT/US2023/063567
§ 371 (c)(1),
(2) Date: Sep. 3, 2024

(87) PCT Pub. No.: WO2023/168330
PCT Pub. Date: Sep. 7, 2023

(65) Prior Publication Data
US 2025/0181166 A1      Jun. 5, 2025

Related U.S. Application Data

(60) Provisional application No. 63/316,118, filed on Mar. 3, 2022.

(51) Int. Cl.
*G06F 3/01*               (2006.01)

(52) U.S. Cl.
CPC ..................................... *G06F 3/016* (2013.01)

(58) Field of Classification Search
None
See application file for complete search history.

(56) References Cited

U.S. PATENT DOCUMENTS

| | | | | |
|---|---|---|---|---|
| 9,738,105 B2 * | 8/2017 | MacPherson | .......... | G02B 5/288 |
| 2009/0034055 A1 * | 2/2009 | Gibson | ..................... | G02F 1/23 |
| | | | | 359/296 |

(Continued)

FOREIGN PATENT DOCUMENTS

| | | | | |
|---|---|---|---|---|
| CN | 107121716 A | * | 9/2017 | ............. G02B 5/008 |
| EP | 3035158 A1 | * | 6/2016 | ............. G06F 3/016 |

(Continued)

OTHER PUBLICATIONS

Translation of CN-107121716-A into English; Gong et al. (Year: 2017).*

(Continued)

*Primary Examiner* — Brian M Butcher
(74) *Attorney, Agent, or Firm* — Barnes & Thornburg LLP

(57) ABSTRACT

Technologies for optically controlling friction include a plasmon-active photofriction element, or a friction pixel. A structure includes a base substrate material, a plasmon-active element coupled to the base substrate material, and a frictional interface material. The frictional interface material is positioned at a surface of the structure and has a phonon mode. The plasmon-active element includes a pattern comprising multiple pattern elements that have a plasmon mode tuned to couple with the phonon mode of the frictional interface material. When illuminated, the plasmon mode of the plasmon-active element is excited. Thus, energy dissipation of a sliding contact across the surface of the structure is changed to generate an active decrease or increase in (Continued)

400

402

LASER OFF ○
LASER ON ● friction based on light illumination frequency or intensity. The frictional interface material may include silica, and the plasmon-active element may include graphene. Other embodiments are described and claimed.

20 Claims, 5 Drawing Sheets

(56) References Cited

U.S. PATENT DOCUMENTS

| | | | | |
|---|---|---|---|---|
| 2010/0259826 A1* | 10/2010 | Ji | .......................... | H10F 77/315 |
| | | | | 359/599 |
| 2013/0148194 A1 | 6/2013 | Altug et al. | | |
| 2017/0242163 A1* | 8/2017 | Aksyuk, IV | .......... | G02B 1/002 |
| 2021/0266394 A1 | 8/2021 | Tang et al. | | |
| 2022/0050354 A1 | 2/2022 | Park et al. | | |

FOREIGN PATENT DOCUMENTS

| | | | | | |
|---|---|---|---|---|---|
| WO | WO-2010118418 A2 | * | 10/2010 | ............. | B82Y 20/00 |
| WO | WO-2015066808 A1 | * | 5/2015 | ............. | B32B 25/12 |
| WO | WO-2015066810 A1 | * | 5/2015 | ............. | B32B 25/12 |

OTHER PUBLICATIONS

PCT Search Report and Written Opinion prepared for PCT Application No. PCT/US2023/063567, mailed Sep. 29, 2023.
Negrito, Maelani, et al., "Using Patterned Self-Assembled Monolayers to Tune Graphene• Substrate Interac• ions," 2021, Langmuir,Nr: 37, pp. 9996-10005.

* cited by examiner

300

400

TECHNOLOGIES FOR OPTICALLY CONTROLLING FRICTION WITH PLASMON-ACTIVE PHOTOFRICTION ELEMENTS

CROSS-REFERENCE TO RELATED APPLICATIONS

This application is a national stage entry under 35 USC § 371(b) of PCT International Application No. PCT/US2023/063567, filed Mar. 2, 2023, which claims the benefit of and priority to U.S. Patent Application No. 63/316,118, entitled "METHOD FOR OPTICALLY CONTROLLING FRICTION," which was filed on Mar. 3, 2022, the entirety of both of which are incorporated herein by reference.

BACKGROUND

Friction is an energy dissipation mechanism that occurs at the interface of sliding contacts. The mechanism of energy dissipation is through vibrational excitation or coupling that impacts the amount of energy needed to slip at a contact. The friction is also influenced by adhesion between the contacts, which is a function of the molecular forces acting between the material pairs in contact. By controlling both adhesion and the mechanism of energy dissipation. the friction of an interface can be controlled. The change of materials pairs represents a static mechanism of controlling friction, while alteration of the mechanism of energy dissipation can be an active means of friction control. Active mechanisms for controlling friction have typically been limited to electrostatic and thermal (heat) mechanisms.

SUMMARY

According to one aspect of the disclosure, a photofriction structure comprises a base substrate material, a plasmon-active element coupled to the base substrate material and a frictional interface material positioned at a surface of the photofriction structure. The plasmon-active element includes a pattern comprising a plurality of pattern features. The frictional interface material has a first predetermined phonon mode. The pattern of the plasmon-active element has a first predetermined plasmon mode tuned to couple with the first predetermined phonon mode of the frictional interface material.

In an embodiment, the photofriction structure further comprises a light source optically coupled to the plasmon-active element, wherein the light source is configured to selectively illuminate the plasmon-active element at a predetermined frequency that excites the first predetermined plasmon mode of the plasmon-active element. In an embodiment, the light illumination comprises infrared light, and wherein the light source comprises an infrared light emitting diode (LED). In an embodiment, excitation of the first predetermined plasmon mode by the light illumination controls friction of the frictional interface material at the surface of the photofriction structure.

In an embodiment, each the plurality of pattern features is separated from another pattern feature by a predetermined pitch distance. In an embodiment, the predetermined pitch distance comprises about 200 nm.

In an embodiment, the base substrate material and the frictional interface material comprise silicon dioxide; and the plasmon-active element comprises: a plurality of self-assembled monolayers of a perfluorophenyl azide (PFPA) arranged in the pattern and coupled to the base substrate material at each pattern feature; a layer of patterned silane coupled to the base substrate material outside of the plurality of self-assembled monolayers of PFPA; and a graphene monolayer coupled to the layer of patterned silane and reacted with the plurality of self-assembled monolayers of PFPA.

In an embodiment, the base substrate material and the frictional interface material comprise glass, and each pattern feature of plasmon-active element comprises a gold nanorod. In an embodiment, the gold nanorod has a height of about 80 nanometers, a width of about 200 nm, and a length of between 1000 nm and 2000 nm. In an embodiment, each of the plurality of pattern features is separated from another pattern feature by a predetermined pitch distance comprising about 2300 nm. In an embodiment, each of the plurality of pattern features is separated from another pattern feature by a predetermined pitch distance comprising between 3000 nm and 3800 nm.

In an embodiment, the frictional interface material is coupled to the plasmon-active element, and a surface of the frictional interface material comprises the surface of the photofriction structure. In an embodiment, the base substrate material comprises the frictional interface material, and wherein the plasmon-active element is embedded in the base substrate material.

According to another aspect, a method for an active photofriction interaction comprises providing a photofriction structure comprising (i) a base substrate material, (ii) a plasmon-active element coupled to the base substrate material and including a pattern comprising a plurality of pattern features, and (iii) a frictional interface material positioned at a surface of the photofriction structure and having a first predetermined phonon mode, wherein the pattern of the plasmon-active element has a first predetermined plasmon mode tuned to couple with the first predetermined phonon mode of the frictional interface material; and selectively illuminating the photofriction structure at a predetermined frequency that excites the first predetermined plasmon mode of the plasmon-active element with a light source that is optically coupled to the plasmon-active element.

In an embodiment, the predetermined frequency comprises infrared light. In an embodiment, selectively illuminating the photofriction structure controls friction of the frictional interface material at the surface of the photofriction structure. In an embodiment, selectively illuminating the photofriction structure comprises selecting part of the photofriction structure to provide a haptic interface. In an embodiment, wherein selectively illuminating the photofriction structure comprises selecting part of the photofriction structure to provide a sliding touch interface.

In an embodiment, the photofriction structure is coupled to a touch screen device or a touch pad device. In an embodiment, the plasmon-active element comprises a plurality of self-assembled monolayers of a perfluorophenyl azide (PFPA) arranged in the pattern and coupled to the base substrate material at each pattern feature; a layer of patterned silane coupled to the base substrate material outside of the plurality of self-assembled monolayers of PFPA; and a graphene monolayer coupled to the layer of patterned silane and reacted with the plurality of self-assembled monolayers of PFPA.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
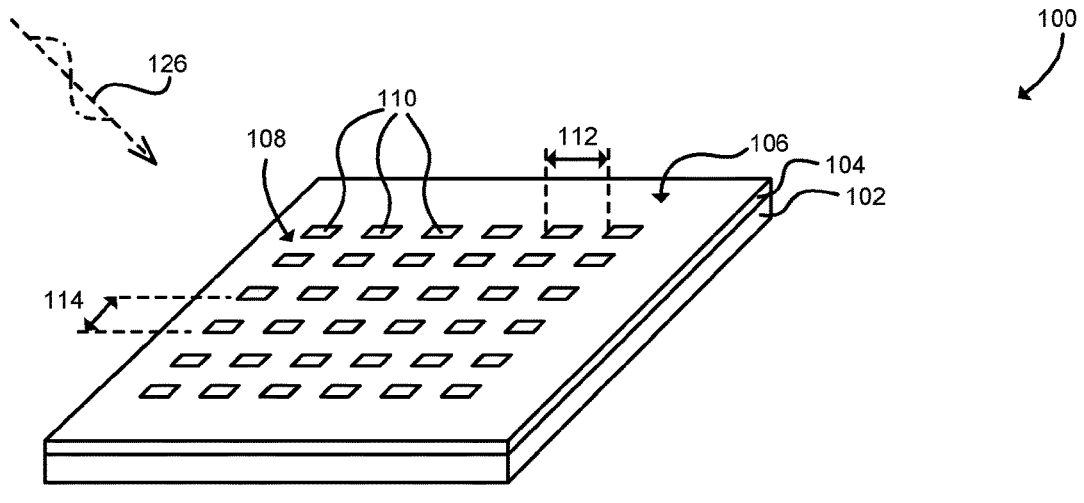
FIG. 1 is a schematic diagram illustrating at least one embodiment of a photofriction structure including a plasmon-active element.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 2:
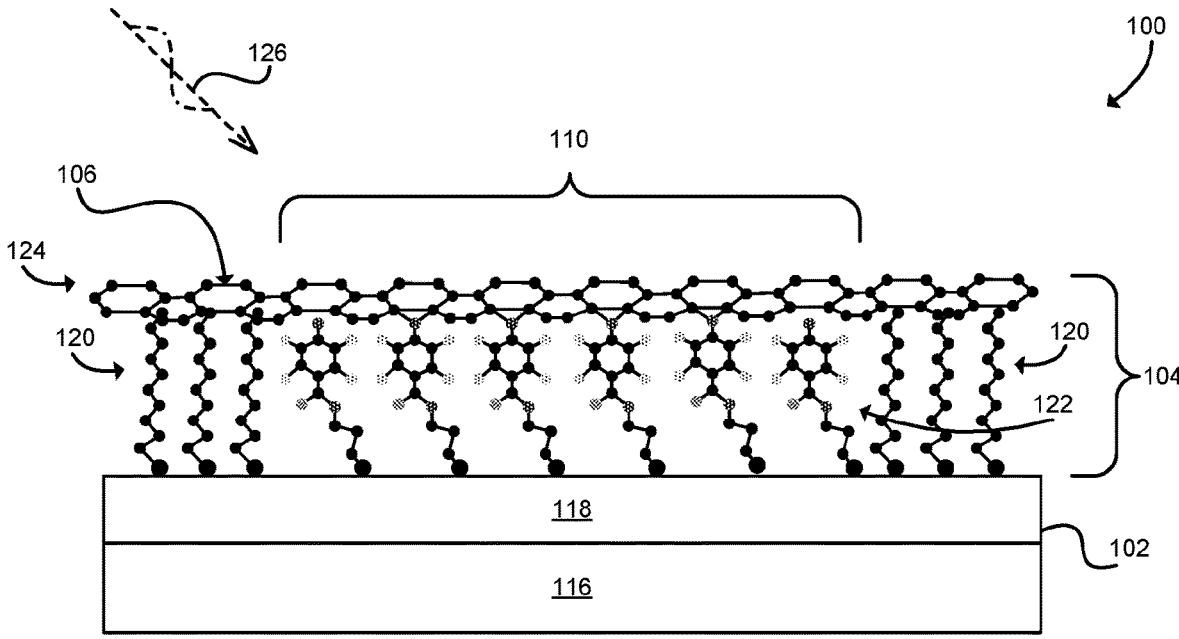
FIG. 2 is a cross-sectional schematic diagram illustrating the photofriction structure of FIG. 1.

Referring now to FIGS. 1 and 2, an illustrative photofriction structure 100 includes a substrate 102 coupled to a plasmon-active element 104. In use, as described further below, when part or all of the plasmon-active element 104 is illuminated with light having a particular frequency, friction at a surface 106 of the photofriction structure 100 is changed (e.g., increased or decreased) due to strong plasmon-phonon coupling between the plasmon-active element 104 and a frictional interface material positioned on a side of the friction interface at the surface 106. For example, in some embodiments, the plasmon of the plasmon-active element 104 may couple with a phonon mode of a material such as a thin glass cover positioned at the surface 106 of the photofriction structure 100. As another example, the plasmon of the plasmon-active element 104 may couple with a phonon mode of a material in sliding contact with the surface 106, such as a silica stylus, force-sensing tip, or other material Accordingly, the photofriction devices and systems disclosed herein provide for active control of friction using light. The disclosed photofriction devices and systems allow the energy dissipation processes that control the friction an interface experiences to be controllably and reversibly altered. In contrast, typical systems may control friction passively, for example by changing the materials in contact with reduced or increased coefficients of friction. Additionally, the disclosed photofriction devices and systems control friction of an interface through plasmon-phonon coupling, and do not rely on changes in material's stiffness via changes in molecular organization. In other words, while friction is controlled by controlling illumination, the stiffness of the materials remains constant. Accordingly, the disclosed photofriction devices and systems may enable new interaction modalities for computing devices or other interaction devices, including active, interactive haptic interfaces and sliding interfaces. Similarly, the disclosed photofriction devices and systems may enable active friction control for grip surfaces such as control surfaces (e.g., handles, buttons, levers, etc.), robotic grippers, clutch surfaces, or other mechanical devices.

As shown in FIG. 1, the photofriction structure 100 includes the substrate 102 and the plasmon-active element 104. The plasmon-active element 104 includes a pattern 108 of multiple pattern features 110 distributed across the surface 106. The pattern 108 is illustratively a rectangular grid; however, the pattern 108 may have a different shape and/or distribution in other embodiments. As shown, the pattern features 110 are separated in one direction by a pitch distance 112 and in another direction by a pitch distance 114. Illustratively, each pitch distance 112, 114 is about 200 nm.

As best shown in FIG. 2, the substrate 102 includes a single side polished silicon Si(100) wafer 116. A layer of thermal oxide 118 is grown on the wafer 116. The oxide layer 118 includes silicon dioxide and is about 1070 nm thick. As described above, the plasmon-active element 104 is formed on the surface of the oxide layer 118 or otherwise coupled to the oxide layer 118.

Referring now to FIG. 2, a cross-sectional view of a pattern feature 110 of the photofriction structure 100 is shown. Illustratively, the plasmon-active element 104 includes a silane layer 120 deposited on the surface of the oxide layer 118. The silane layer 120 is illustratively a self-assembled monolayer of decyltrichlorosilane (C10), although in other embodiments a different silane compound may be used. The silane layer 120 is patterned, for example using colloidal sphere lithography, with multiple pores arranged in the pattern 108. Each of those pores is filled with a self-assembled monolayer 122 of perfluorophenyl azide (PFPA). A graphene layer 124, which may be a graphene monolayer, is deposited on top of the silane layer 120 and the PFPA monolayer 122. The graphene layer 124 reacts with the PFPA 122, for example through covalent bonding after heating the graphene 124 and the PFPA 122. This reaction shifts the plasmon of the graphene 124 to match the optical phonon of silica. The particular plasmon frequency of the graphene 124 may depend on dimensions of the pattern 108 and/or the pattern features 110 (e.g., the pitch distance 112, 114, pore size, or other dimensions), as well as chemical modification of the graphene 124 by the PFPA monolayer 122. For example, in the illustrative embodiment, the chemical interaction between the graphene 124 and the PFPA 122 creates the pattern 108 by locally changing the band structure of the graphene 124 with minimal degradation of its electronic properties. Accordingly, the plasmon-active element 104 includes the graphene layer 124, the PFPA monolayer 122, and the silane layer 120 positioned over the substrate 102.

As described further below, in use, the photofriction structure 100 may be illuminated with incident light 126. The light 126 excites the plasmon of the plasmon-active element 104. The plasmon couples with the phonon of another material, such as a thin outer layer positioned at the surface 106 of the photofriction structure 100, which causes friction at the surface 106 to change. The incident light 126 has a predetermined frequency that is selected to excite the plasmon of the plasmon-active element 104. Illustratively, the light 126 is infrared light; however, in other embodiments the light 126 may have any other appropriate frequency. The light 126 may be generated by a controlled light source, such as an infrared laser, an infrared light-emitting diode (LED), or other light source. Further, although illustrated in FIG. 1 as being incident on the surface 106 of the photofriction structure 100, it should be understood that the light 126 may be incident from any other angle or angles, including from below, through the substrate 102 in some embodiments.

Figure 3:
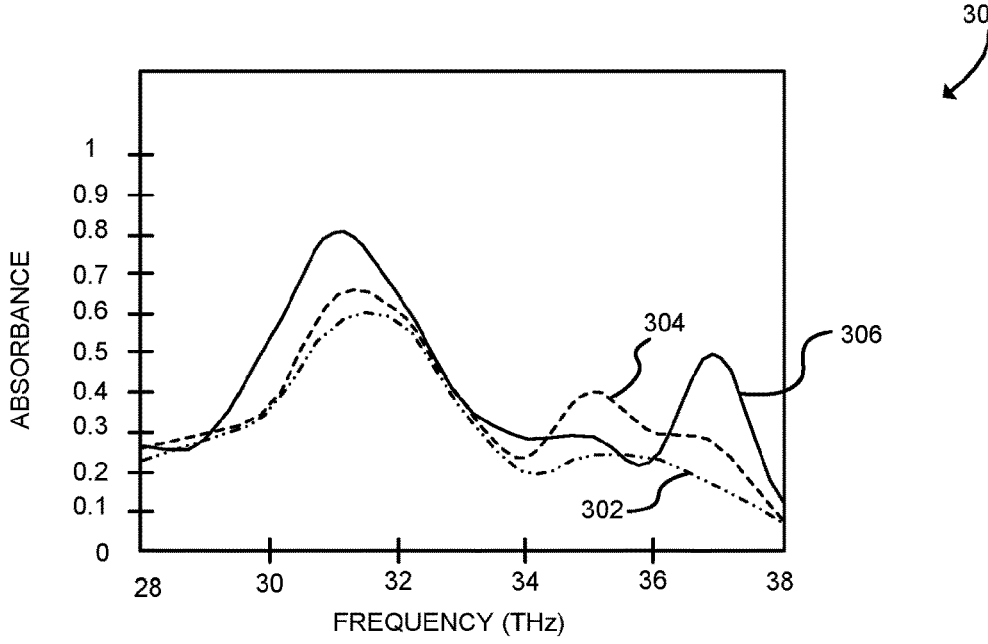
FIGS. 3 and 4 are charts including illustrative experimental results that may be achieved with various embodiments of the photofriction structure of FIGS. 1 and 2.

Referring now to FIG. 3, chart 300 illustrates calculated results that may be achieved by an illustrative photofriction structure 100 as shown in FIGS. 1 and 2. The chart 300 illustrates absorbance versus frequency for y-polarized light incident on the plasmon-active element 104. The results shown in the chart 300 are illustrative and may be generated through experimentation and/or simulation. For example, the results may be calculated using finite element method (FEM) operations to solve Maxwell's equations. Curve 302 shows absorption for a device including a silica substrate 102 but not including the graphene layer 124. Curve 304 shows absorption for a device including the silica substrate 102, the silane layer 120, and the graphene layer 124, but not including any pattern 108 of PFPA molecules 122. Curve 306 shows absorption for a structure 100 similar to that shown in FIGS. 1 and 2, including the silica substrate 102, the silane layer 120, the pattern 108 of PFPA molecules 122, and the graphene layer 124. As shown, the graphene layer 124 that reacts with the patterned PFPA 122 shows increased absorption compared to the silica substrate 102 and compared to unpatterned graphene 124. In the illustrative embodiment, absorbance is about 33% greater for the graphene 124 with patterned PFPA 122 as compared to the silica substrate 102 alone. This increased absorption is due to increased coupling between the graphene plasmon and the silica phonons.

Figure 4:
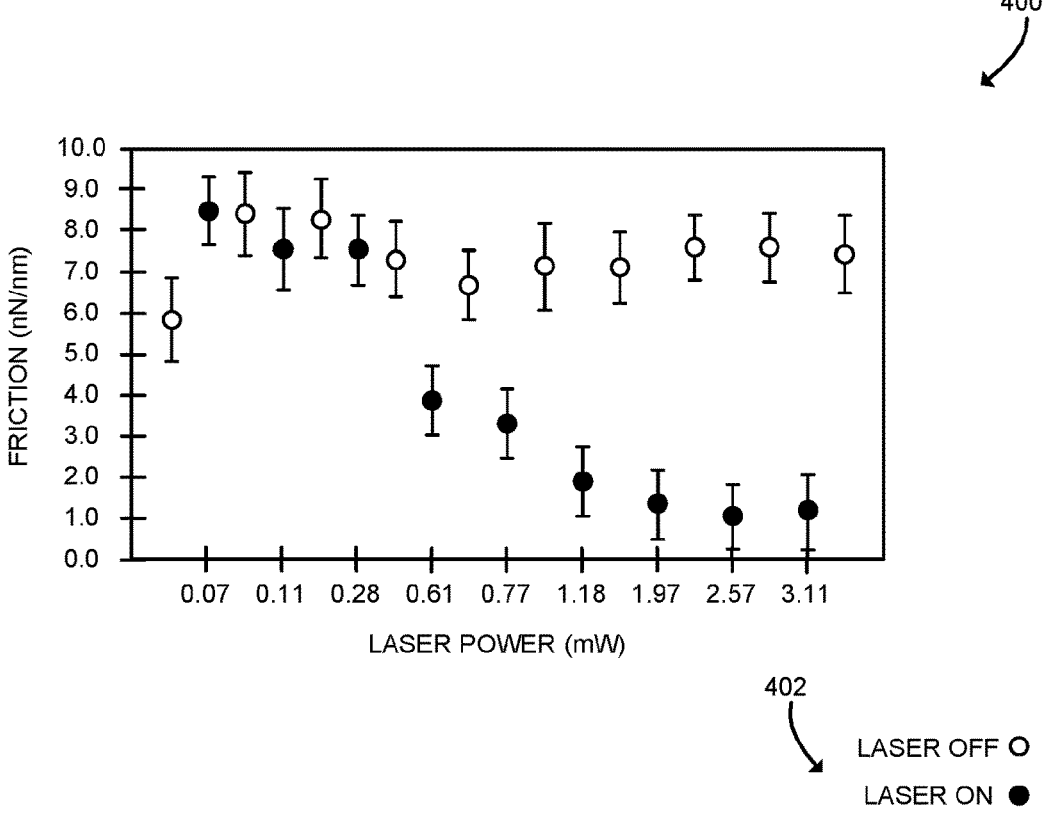

As described above, the optical coupling of the patterned graphene plasmon with the silica phonon causes a change in friction at a surface interface. In the illustrative embodiment. increasing illumination of the plasmon-active element 104 at the resonance frequency of the graphene plasmon and the silica phonon causes friction to decrease. Referring now to FIG. 4. chart 400 illustrates experimental results that may be achieved using an illustrative photofriction structure 100 of FIGS. 1 and 2. In an experiment, the surface 106 of the plasmon-active element 104 was selectively illuminated with light at the resonant frequency of the graphene plasmon and the silica phonon, which is 1100 cm$^{-1}$. This incident light was generated by a laser and is in the infrared region of the spectrum. Of course, in other embodiments, the light may be generated by an IR LED or any other suitable IR light source. Friction on the surface 106 of the graphene layer 124 was measured using atomic force microscopy using a silica tip. As indicated by legend 402, in the chart 400, open circles indicate friction measurements when the laser light is off (not illuminated), and closed circles indicate friction measurements when the laser light is on (illuminated). During the experiment, friction was measured by atomic force microscopy with illumination turning off and on between measurements with increasing illumination power. As shown in FIG. 4, friction is decreased as the structure 100 is illuminated. Additionally, when the laser illumination is removed, friction returns to its original, higher level. This indicates that the laser does not damage the graphene layer 124. Accordingly, the photofriction structure 100 allows for optically controllable friction.

Figure 5:
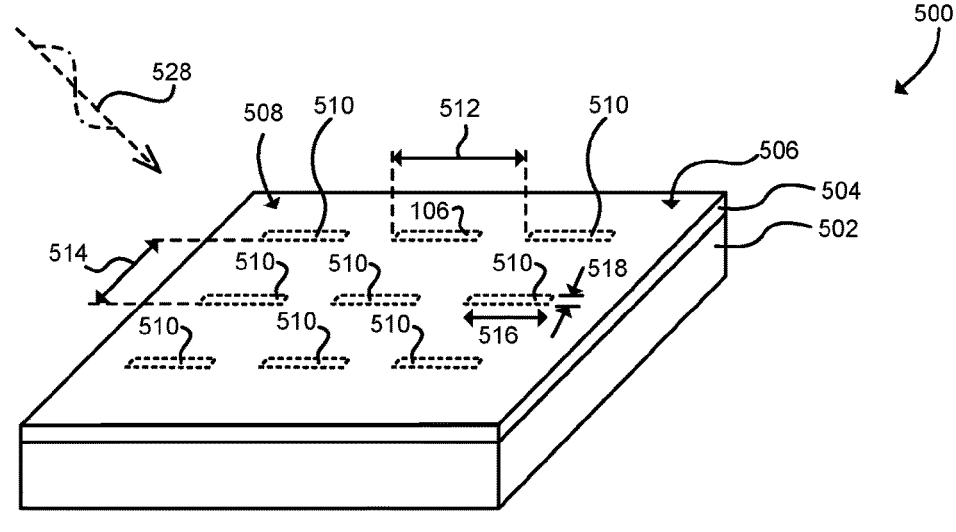
FIG. 5 is a schematic diagram illustrating at least one embodiment of another photofriction structure including a plasmon-active element.
Figure 6:
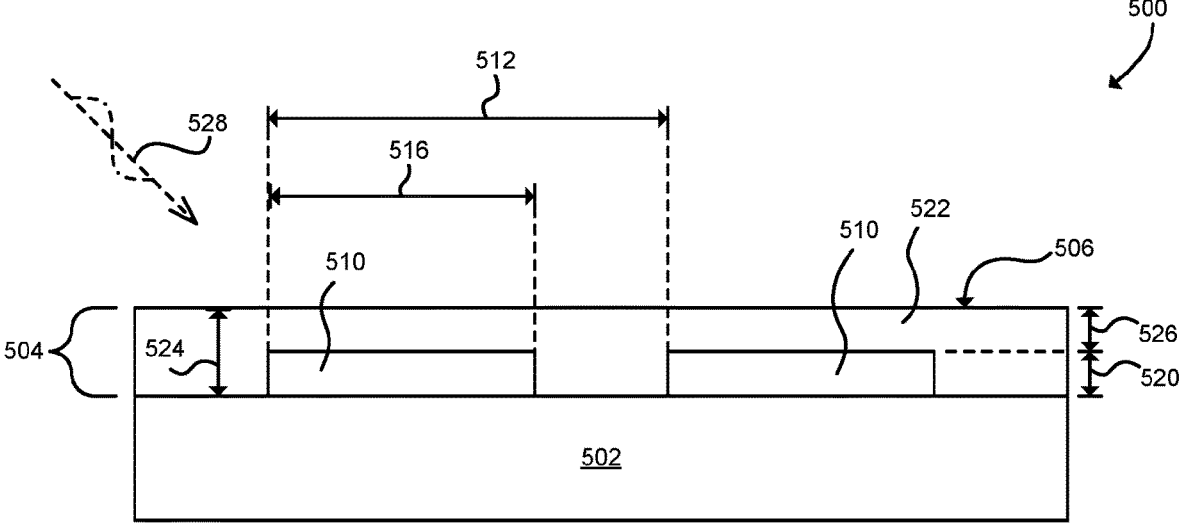
FIG. 6 is a cross-sectional diagram illustrating the photofriction structure of FIG. 5.

Referring now to FIGS. 5 and 6, another embodiment of a photofriction structure 500 is shown. Similar to the photofriction structure 100, the illustrative photofriction structure 500 includes a substrate 502 and a plasmon-active element 504. A surface 506 of the plasmon-active element 504 is a friction interface for the photofriction structure 500. The plasmon-active element 504 includes a pattern 508 of multiple pattern features 510 embedded within in the plasmon-active element 504 and distributed across the surface 506. The pattern 508 is illustratively a rectangular grid; however, the pattern 508 may have a different shape and/or distribution in other embodiments. As shown, the pattern features 510 are separated in one direction by a pitch distance 512 and in another direction by a pitch distance 514. For example, each pitch distance 512, 514 may be about 200 nm, about 2300 nm, or between about 3000 nm and 3800 nm.

As shown, each pattern feature 510 may be embodied as a three-dimensional shape such as a rectangular prism, rod, or other shape. Accordingly, each pattern feature 510 may have dimensions including a length 516, a width 518, and a height or thickness 520. As described further below, the dimensions 516, 518, 520 and/or the pitch widths 512, 514 may be controlled or otherwise varied in order to tune the plasmon resonance frequency of the pattern 508 to the phonon of a desired material. In some embodiments one or more different plasmon modes may be tuned. For example, in some embodiments, resonant frequency may be tuned for a lattice plasmon mode, a grating plasmon mode, a particle plasmon mode, or other plasmon mode. As an example, in some embodiments, the dimensions of each pattern feature 510 may be nano-scale. Continuing that example, each pattern feature 510 may have a height 520 of about 80 nm, a width 518 of about 200 nm, and a length 520 of between about 1000 nm and 2000 nm.

As best shown in FIG. 6, the plasmon-active element 504 further includes a thin outer layer 522. The pattern features 510 are embedded in, coated with, or otherwise covered by the thin outer layer 522. As shown, the thin outer layer 522 has a total thickness 524 and a thickness 526 above the pattern features 510. The thickness 526 is thin enough such that the resonant plasmon generated by the pattern features 510 reaches the surface 506 of the thin outer layer 522. For example, in an embodiment the thickness 526 may be on the order of tens of nanometers, or about 10 nm. Continuing the example described above, given that the height 520 of the pattern features 510 is about 80 nm, in that example, the total thickness 524 of the thin outer layer 522 may be about 90 nm. The patterning of those materials may be undertaken using micro-and nano-fabrication techniques such as photolithography, colloidal lithography, various deposition and etching techniques, and/or additive manufacturing techniques.

As described further below, in use, the photofriction structure 500 may be illuminated with incident light 528. The light 528 excites the plasmon of the plasmon-active element 504. The plasmon couples with the phonon of another material, such as the thin outer layer 522 positioned at the surface 506 of the photofriction structure 500, which causes friction at the surface 506 to change. The incident light 528 has a predetermined frequency that is selected to excite the plasmon of the plasmon-active element 504. Illustratively, the light 528 is infrared light; however, in other embodiments the light 528 may have any other appropriate frequency. The light 528 may be generated by a controlled light source, such as an infrared laser, an infrared light-emitting diode (LED), or other light source. Further, although illustrated in FIG. 5 as being incident on the surface 506 of the photofriction structure 500, it should be understood that the light 528 may be incident from any other angle or angles, including from below, through the substrate 502 in some embodiments.

As described above, the plasmon mode of the plasmon-active element 504 strongly couples with the phonon mode of a material such as the thin outer layer 522 and/or the substrate 502. In order to control this coupling, the plasmon mode of the plasmon-active element 504 may be tuned by adjusting the materials used to form the pattern features 510 and the thin outer layer 522 and/or the substrate 502. For example, in some embodiments the pattern features 510 may be formed from gold, silver, copper, or any other plasmonic material. In those embodiments, the cover layer 522 may be formed from glass, silica, a dielectric material, or another material. In some embodiments, the thin outer layer 522 may be formed from the same material as the substrate 502 (e.g., glass).

Figure 7:
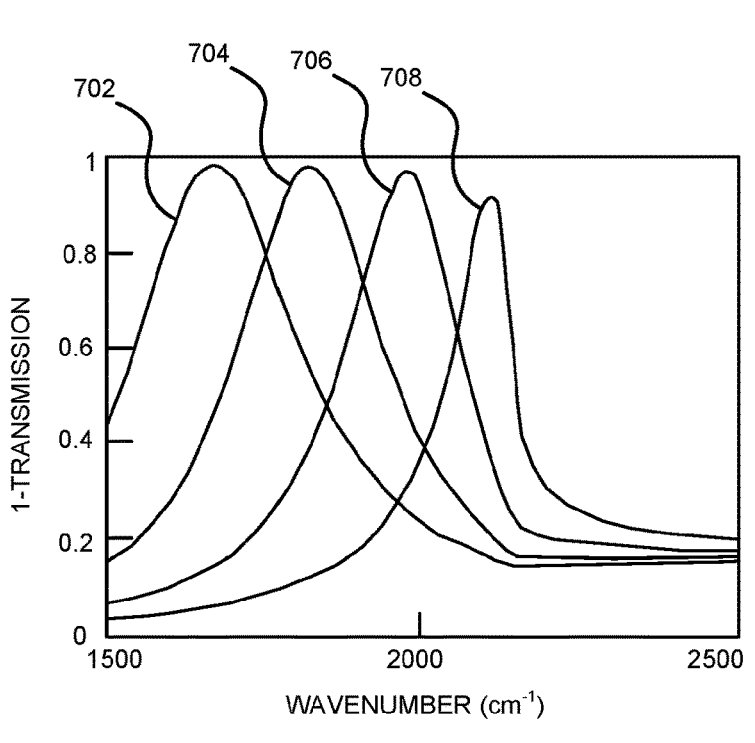
FIGS. 7 and 8 are charts including illustrative computational results that may be achieved with various embodiments of the photofriction structure of FIGS. 5 and 6.

The plasmon mode of the plasmon-active element 504 may also be tuned by adjusting feature size of the pattern 508, for example by adjusting one or more of the pitch distances 512, 514 and/or the dimensions 516, 518, 520 of the pattern features 510. Referring now to FIG. 7, chart 700 illustrates experimental calculations of example ranges of tuning the plasmon resonances of the pattern features 510 for an illustrative photofriction structure 500. It should be understood that the calculations shown in the chart 700 are illustrative and are not exclusive to any particular embodiment. The chart 700 illustrates absorption (1-transmission) versus wavenumber for light polarized with the E-field in the long dimension of the patterned features 510 and incident on the photofriction structure 500. In the illustrative structure 500 used with FIG. 7, the substrate 502 and the thin outer layer 522 are silicon dioxide glass, and the pattern features 510 are gold nanorods. In this illustrative example, for each pattern feature 510, the height 520 is 80 nm, the width 518 is 200 nm, the pitch distance 512 is 2300 nm, the pitch distance 514 is 3400 nm, and the length 516 is varied for multiple experimental runs. Curve 702 shows absorption when the length 516 is 2000 nm, curve 704 shows absorption when the length 516 is 1800 nm, curve 706 shows absorption when the length 516 is 1600 nm, and curve 708 shows absorption when the length 516 is 1400 nm. As shown, each of the curves 702, 704, 706, 708 shows a peak at a particular resonant wavelength. This peak indicates relatively high absorption of incident light by the plasmon-active element 504 and corresponds to the plasmon mode of the pattern 508. Thus, the peaks indicate strong coupling of incident light and the plasmon mode. As shown, by varying the length 516, the resonant wavelength of the optical plasmon mode may be varied. A particular length 516 may be selected that generates a resonant wavelength of the optical plasmon that matches the phonon mode of the thin outer layer 522 and/or the substrate 502 in which the pattern features 510 are embedded.

Figure 8:
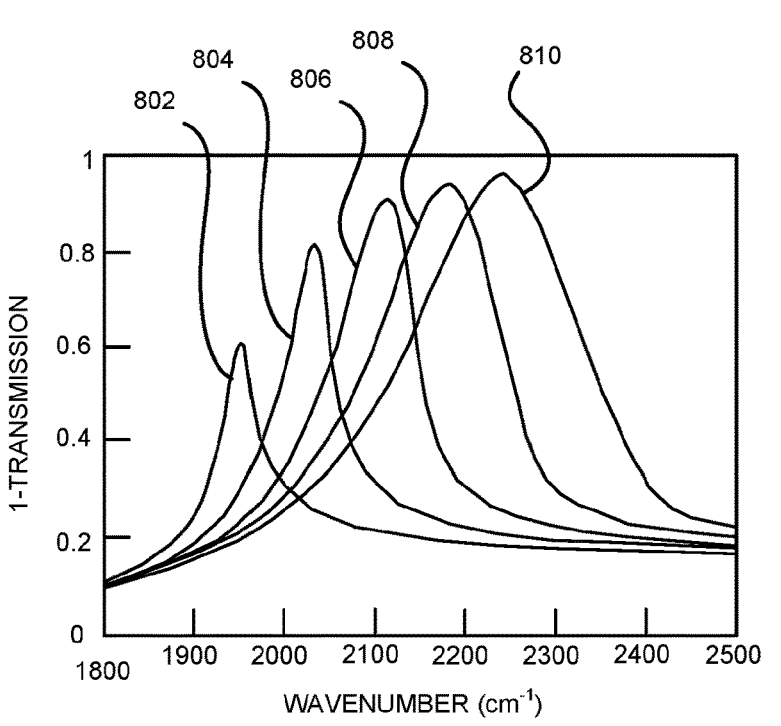
Figure 8:

Referring now to FIG. 8, chart 800 illustrates similar calculations that may be performed for an illustrative photofriction structure 500. The chart 800 similarly illustrates absorption (1-transmission) versus wavenumber for light polarized with the E-field in the long dimension of the pattern features 510 and incident on the plasmon-active element 504. In the illustrative structure 500 used with FIG. 8, the substrate 502 and the thin outer layer 522 are silicon dioxide glass, and the pattern features 510 are gold nanorods. In this illustrative example. for each pattern feature 510, the height 520 is 80 nm, the width 518 is 200 nm, the length 516 is 1400 nm, the pitch distance 512 is 2300 nm, and the pitch distance 514 is varied for multiple experimental runs. Curve 802 shows absorption when the pitch distance 514 is 3800 nm, curve 804 shows absorption when the pitch distance 514 is 3600 nm, curve 806 shows absorption when the pitch distance 514 is 3400 nm, curve 808 shows absorption when the pitch distance 514 is 3200 nm, and curve 810 shows absorption when the pitch distance 514 is 3000 nm. As shown, each of the curves 802, 804, 806, 808, 810 shows a peak at a particular resonant wavelength. This peak indicates relatively high absorption of incident light by the plasmon active element 504 and corresponds to the plasmon mode of the pattern 508. Thus, the peaks indicate strong coupling of incident light with the plasmon mode. As shown, by varying the pitch distance 514, the resonant wavelength of the optical plasmon mode may be varied. A pitch distance 514 may be selected that generates a resonant wavelength of the optical plasmon that matches the phonon mode of the thin cover layer 522 and/or the substrate 502. Additionally or alternatively, other dimensions, pitch distances, and/or other feature sizes and/or shapes may be optimized or otherwise varied in order to match the plasmon mode of the plasmon-active element 504 to the phonon mode of the thin cover layer 522 and/or the substrate 502.

Figure 9:
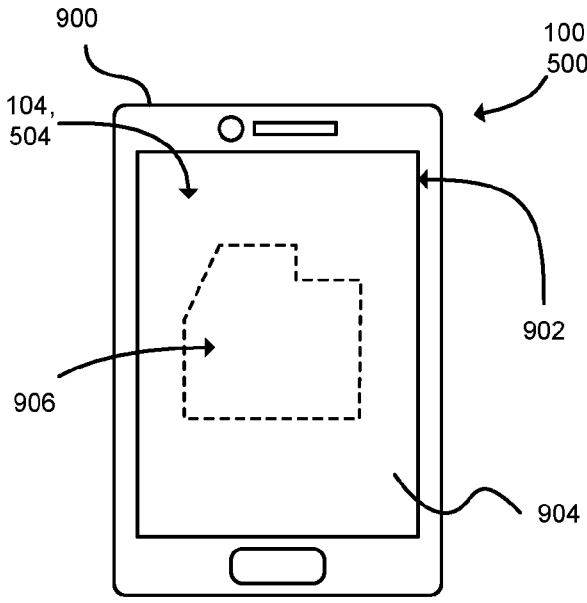
FIG. 9 is a schematic diagram illustrating at least one embodiment of a mobile computing device including a photofriction structure.

Referring now to FIG. 9, an illustrative computing device 900 incorporating a photofriction structure 100, 500 is shown. The computing device 900 is illustratively a smart-phone, however it should be understood that the computing device 900 may be embodied as any type of device capable of performing the functions described herein including, without limitation, a tablet computer, a notebook computer, a laptop computer, a desktop computer, a computer, a consumer electronic device, a smart appliance, a mobile computing device, a cellular phone, and/or any other computing device capable of performing the functions described herein. Accordingly, the computing device 900 may include components commonly found in a portable computing device, such as a processor, and I/O subsystem, memory, data storage, communication circuitry, and/or various input/output devices.

The illustrative computing device 900 further includes a touchscreen display 902. The display 902 may be embodied as any type of display capable of displaying digital images or other information, such as a liquid crystal display (LCD), a light emitting diode (LED), a plasma display, or other type of display device. In particular, in some embodiments the display 902 may include a light source capable of emitting visible light (e.g., one or more RGB LEDs) as well as a light source capable of emitting infrared light (e.g., one or more IR LEDs). The display 902 may be used to display a user interface, interactive applications, or other interactive data. As described above, the display 802 may be coupled to a touchscreen device such as a capacitive sensing layer or other touch-sensitive interface.

The display 902 includes a screen 904, which is illustratively a glass substrate similar to the substrate 102, 502. A plasmon-active element 104, 504 is coupled to the display screen 904, similar to being coupled to a substrate 102, 502 as described above. Also as described above, the plasmon-active element 104, 504 includes a pattern 108, 508 of pattern features 110, 510. A thin outer layer of glass may be deposited on the plasmon-active element 104, 504, or in some embodiments may be included in the plasmon-active element 104, 504. Accordingly, a user of the computing device 900 may touch or otherwise interact with the surface 106, 506 of the photofriction structure 100, 500.

In use, friction experienced by the user on the surface of the screen 904 may be controlled by selectively illuminating parts of the pattern 108, 508 using a light source, either externally or from the display 902 itself. For example, as shown in FIG. 9, a part 906 of the display 902 may be illuminated with infrared light, causing the surface of the screen 904 over that part 906 to have a different friction than other parts of the screen 904. Accordingly, the device 900 may provide a haptic interface in which a user is able to perceive changes in friction by touch, for example as changes in surface texture. As another example, the device 800 may provide a touch interface in which a user is able to perceive differences in surface texture for user interface elements such as a button, toggle, slider, scroll bar, or other virtual element. The light source has a predetermined wavelength that excites the plasmon of the plasmon-active element 104, 504. As described above, the light source may be an infrared (IR) light source. Accordingly, the device 900 may control friction of the surface of the screen 904 using light that is not visible to a user of the device 800.

Although illustrated as including a plasmon-active element 104, 504 in a touch screen of a mobile device 900, it should be understood that similar haptic or sliding interfaces may be provided for other devices, such as touch pads, automotive displays, smart displays, or other devices. In some embodiments, optically controlled plasmon-active elements 104, 504 may be included in gloves, robotic hands/feet, and/or grippers. In those embodiments, friction between the gloves or robotic components and the surfaces that they are in contact with could be modulated.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

EXAMPLES

In an experiment, a photofriction device similar to the photofriction structure 100 shown in FIGS. 1 and 2 and described above was constructed. The base substrates used are single side polished Si(100) wafers with ~1070 nm of thermal oxide grown on them. To prepare these, the wafers were score cut and cleaned by soaking in a base piranha solution of a 4:1:1 (v/v/v) ratio of nanopure water (18.2 M$\Omega$·cm), concentrated NH$_4$OH, and H$_2$O$_2$ (30% wt.) at 85° C. for 20 min before being rinsed thoroughly with nanopure water, then 200 proof ethanol, and dried with streaming N$_2$. The cleaned wafers were then thermally oxidized in a kiln at 1050° C. for 99 hr 44 min to produce the thermal oxide film on the Si(100) surface. Afterwards, the SiO$_2$/Si(100) surfaces were again cleaned with a base piranha solution at 85° C. for 20 min and rinsed and dried as before.

To prepare patterns of decyltrichlorosilane (OTS) on the surfaces, the clean and oxidized Si substrates described above were patterned using colloidal sphere lithography. SiO$_2$ spheres with a diameter of 0.2 μm (NIST) were centrifuged at 3400 rpm for 5 min, the supernatant was removed, and the spheres were covered and stored overnight to dry. The SiO$_2$ spheres were then suspended in nanopure water to achieve a ca. 4% (w/v) solution. Immediately after preparing the oxidized substances described above, 10 μL of the 4% w/v SiO2 sphere solution was drop cast onto the wafer. The drop cast wafers were then placed in a nitrogen tent with a relative humidity, RH, of 30±2%, controlled by bubbling nitrogen through water into the tent and were left to dry for 3 hr. This produced a close-packed hexagonal pattern upon drying with feature spacing equivalent to the particle diameter.

After drying, the sphere templated wafers were placed in a dry N$_2$ environment (<0.1% RH) where they were immersed in a 0.5 mM solution of decyltrichlorosilane (C10) in toluene and allowed to react for 2 hr to form a templated self-assembled monolayer. To remove the SiO$_2$ spheres and any physisorbed OTS, the wafers were sonicated for 45 min in a series of solvents (once in fresh toluene, twice in fresh ethanol), rinsing the wafers with ethanol in between sonication cycles. After the final ethanol sonication, the wafers were rinsed with water then ethanol and dried with streaming N2.

To create a mixed monolayer, the templated OTS SAMs were back filled with perfluorophenylazide (PFPA). Additionally, a reference sample of C10 pores were backfilled with C10 to account for a potential effect of disorder in the backfilled SAM. For the C10-filled pores, the OTS-patterned wafer was soaked in a 0.5 mM decyltrichlorosilane (C10) in toluene solution and allowed to react for 2 hr. The wafers were sonicated for 1 hr in subsequent solvents (once in fresh toluene, twice in fresh ethanol), rinsing the wafers with ethanol in between sonication cycles. After the final ethanol sonication, the wafers were rinsed with water then ethanol and dried with streaming N$_2$. For the perfluorophenylazide filled pores, a solution of 0.1 mM PFPA (>90%) in toluene was prepared and the C10-patterned wafer was allowed to react in the dark for 4 hr. After reacting, the wafer was cleaned by rinsing with toluene before being sonicated in fresh toluene for 10 min at room temperature (~21.3° C.), rinsed with nanopure water then ethanol, sonicated in ethanol for 10 min and subsequently being rinsed with nanopure water then ethanol and dried with streaming N$_2$.

Following SAM preparation, graphene was transferred onto the desired substrates (empty pores formed by the C10 matrix, PFPA-filled pores, or C10-filled pores) via a drytransfer method. A section of CVD graphene on copper was coated with a 31.5 mg/mL solution of polystyrene (PS) in toluene as a self-releasing layer (SRL) and heated at 80° C. for 5 min to remove residual solvent. The SRL is used to facilitate the removal of the PDMS stamp after transferring the graphene.

A polydimethylsiloxane (PDMS) stamp (~0.5 mm thickness) was then placed on top of the PS-coated graphene as a support. The graphene on copper stack was then placed on top of a 0.065 M solution of sodium peroxydisulfate for at least 6 hr to etch away the underlying copper. Once the copper was removed, the etchant solution was carefully displaced by flowing clean purified lab water. Afterwards, the graphene-PS-PDMS was removed from the water surface and placed onto the patterned SAM substrate using tweezers and left in a vacuum desiccator to dry. The sample was then heated to 100° C. for 5 min to reach the glass transition temperature of the PS SRL layer and the PDMS was removed using tweezers. The graphene covered sample was then dipped in fresh toluene to remove residual PS from the surface. To further drive covalent bonding between the graphene and PFPA (either on the patterned surfaces or the monolayer) samples were heated at 140° C. for 40 min under ambient conditions. As described in the literature, upon heating, one of the N—N double bonds breaks allowing for the loss of an $N_2$ group thereby leaving a nitrene end group which then undergoes a [2+1] cycloaddition reaction with the graphene lattice.

Graphene layer thickness was identified using Raman microspectroscopy.18 A WiTec Alpha 300RA confocal microscope equipped with an UHTS 300 VIS spectrometer, and a cooled (–60° C.) Andor EMCCD detector was used. A 488 nm diode laser with a power of <1.25 mW was focused to a spot size of ~360 nm with a Nikon E Plan objective (100x, 0.9 NA). For all spectral maps, the 600 g/mm grating was used.

Atomic force microscopy was performed using a nanoIR2-sTM System (Anasys Instruments) in an ambient environment (23° C. and 50% relative humidity) at a nominal applied load of 5 nN. Data analysis was performed using the software program Gwyddion. Silicon tips (μMasch) with nominal spring constants of ca. 0.3 N/m and radii of ca. 20 nm were used in contact mode. The spring constants were determined in situ via the Sader method37 and the radii were determined experimentally using the blind tip reconstruction feature of the software program Scanning Probe Image Processor (SPIP). An OPO laser (1100 cm−1) was used as the source, focused through a numerical aperture of 0.3. Sample results of atomic force microscopy are illustrated in FIG. 4 and described above.

The invention claimed is:

1. A photofriction structure comprising:
a base substrate material;
a plasmon-active element coupled to the base substrate material and including a pattern comprising a plurality of pattern features; and
a frictional interface material positioned at a surface of the photofriction structure and having a first predetermined phonon mode, wherein the pattern of the plasmon-active element has a first predetermined plasmon mode tuned to couple with the first predetermined phonon mode of the frictional interface material.

2. The photofriction structure of claim 1, further comprising a light source optically coupled to the plasmon-active element, wherein the light source is configured to selectively illuminate the plasmon-active element at a predetermined frequency that excites the first predetermined plasmon mode of the plasmon-active element.

3. The photofriction structure of claim 2, wherein the light illumination comprises infrared light, and wherein the light source comprises an infrared light emitting diode (LED).

4. The photofriction structure of claim 2, wherein excitation of the first predetermined plasmon mode by the light illumination controls friction of the frictional interface material at the surface of the photofriction structure.

5. The photofriction structure of claim 1, wherein each the plurality of pattern features is separated from another pattern feature by a predetermined pitch distance.

6. The photofriction structure of claim 5, wherein the predetermined pitch distance comprises about 200 nanometers (nm).

7. The photofriction structure of claim 1, wherein:
the base substrate material and the frictional interface material comprise silicon dioxide; and
the plasmon-active element comprises:
a plurality of self-assembled monolayers of a perfluorophenyl azide (PFPA) arranged in the pattern and coupled to the base substrate material at each pattern feature;
a layer of patterned silane coupled to the base substrate material outside of the plurality of self-assembled monolayers of PFPA; and
a graphene monolayer coupled to the layer of patterned silane and reacted with the plurality of self-assembled monolayers of PFPA.

8. The photofriction structure of claim 1, wherein the base substrate material and the frictional interface material comprise glass, and each pattern feature of plasmon-active element comprises a gold nanorod.

9. The photofriction structure of claim 8, wherein the gold nanorod has a height of about 80 nanometers, a width of about 200 nanometers (nm), and a length of between 1000 nanometers (nm) and 2000 nanometers (nm).

10. The photofriction structure of claim 8, wherein each of the plurality of pattern features is separated from another pattern feature by a predetermined pitch distance comprising about 2300 nanometers (nm).

11. The photofriction structure of claim 8, wherein each of the plurality of pattern features is separated from another pattern feature by a predetermined pitch distance comprising between 3000 nanometers (nm) and 3800 nanometers (nm).

12. The photofriction structure of claim 1, wherein the frictional interface material is coupled to the plasmon-active element, and a surface of the frictional interface material comprises the surface of the photofriction structure.

13. The photofriction structure of claim 1, wherein the base substrate material comprises the frictional interface material, and wherein the plasmon-active element is embedded in the base substrate material.

14. A method for an active photofriction interaction, comprising:
providing a photofriction structure comprising (i) a base substrate material, (ii) a plasmon-active element coupled to the base substrate material and including a pattern comprising a plurality of pattern features, and (iii) a frictional interface material positioned at a surface of the photofriction structure and having a first predetermined phonon mode, wherein the pattern of the plasmon-active element has a first predetermined plasmon mode tuned to couple with the first predetermined phonon mode of the frictional interface material; and
selectively illuminating the photofriction structure at a predetermined frequency that excites the first predetermined plasmon mode of the plasmon-active element with a light source that is optically coupled to the plasmon-active element.

15. The method of claim 14, wherein the predetermined frequency comprises at least one exhibited by infrared light.

16. The method of claim 14, wherein selectively illuminating the photofriction structure controls friction of the frictional interface material at the surface of the photofriction structure.

17. The method of claim 14, wherein selectively illuminating the photofriction structure comprises selecting part of the photofriction structure to provide a haptic interface.

18. The method of claim 14, wherein selectively illuminating the photofriction structure comprises selecting part of the photofriction structure to provide a sliding touch interface.

19. The method of claim 14, wherein the photofriction structure is coupled to a touch screen device or a touch pad device.

20. The method of claim 14, wherein the plasmon-active element comprises:

a plurality of self-assembled monolayers of a perfluorophenyl azide (PFPA) arranged in the pattern and coupled to the base substrate material at each pattern feature;

a layer of patterned silane coupled to the base substrate material outside of the plurality of self-assembled monolayers of PFPA; and a graphene monolayer coupled to the layer of patterned silane and reacted with the plurality of self-assembled monolayers of PFPA.

\* \* \* \* \*